United States Patent

Lehmann et al.

[11] 4,116,601
[45] Sep. 26, 1978

[54] APPARATUS FOR THE PRODUCTION OF FLAKES FROM GRANULAR PRODUCTS

[75] Inventors: Rolf Lehmann, Mutschellen; Alfred Christ, Zurich, both of Switzerland

[73] Assignee: Escher Wyss GmbH, Ravensburg, Wurtt, Germany

[21] Appl. No.: 495,826

[22] Filed: Aug. 8, 1974

[30] Foreign Application Priority Data

Aug. 16, 1973 [CH] Switzerland ............. 11794/73

[51] Int. Cl.² .................................. B29C 15/00
[52] U.S. Cl. ........................... 425/324.1; 425/337; 425/340; 425/363; 425/369; 425/396
[58] Field of Search ............ 425/335, 336, 337, 236, 425/DIG. 235, 324 R, 388, 237, 363, 385, 404, 396, 4 C, 340, 343; 264/3 C, 175, 280, 286, 287, 293; 28/1.8, 72.15; 19/157, 258; 72/231, 226, 234, 206

[56] References Cited

U.S. PATENT DOCUMENTS

| | | | |
|---|---|---|---|
| 1,482,195 | 1/1924 | Kern et al. | 425/337 X |
| 2,290,608 | 7/1942 | Evans | 425/335 X |
| 2,642,013 | 6/1953 | Enoch | 425/337 X |
| 2,699,736 | 1/1955 | Sticelber | 425/337 X |
| 2,751,661 | 6/1956 | Shattuck | 28/1.8 |
| 2,994,917 | 8/1961 | Fritsch | 425/404 X |
| 3,057,012 | 10/1962 | Lufkin | 264/175 X |
| 3,119,328 | 1/1964 | Justus | 100/170 |
| 3,145,241 | 8/1964 | Powell | 425/337 X |
| 3,226,458 | 12/1965 | Graff et al. | 264/286 X |
| 3,283,378 | 11/1966 | Cramton | 425/404 X |
| 3,316,586 | 5/1967 | Sommer | 425/335 X |
| 3,611,522 | 10/1971 | Daniels et al. | 28/72.15 X |
| 3,616,162 | 10/1971 | Noziere | 425/4 C UX |
| 3,897,183 | 7/1975 | Hofmann et al. | 425/335 X |

Primary Examiner—Richard B. Lazarus
Assistant Examiner—Mark Rosenbaum
Attorney, Agent, or Firm—Kenyon & Kenyon, Reilly, Carr & Chapin

[57] ABSTRACT

A rolling mechanism including at least one deflection-compensating roller is used to form flakes of a thickness less than 0.2 millimeters. In addition, a texturizing mechanism is located below the rolling mechanism to receive and deform the flakes into a shape that deviates from a plane shape. The flakes may be corrugated or rolled into cylinders.

12 Claims, 7 Drawing Figures

APPARATUS FOR THE PRODUCTION OF FLAKES FROM GRANULAR PRODUCTS

This invention relates to an apparatus for the production of flakes intended for extraction. More particularly, this invention relates to a apparatus for the production of flakes from granular products.

It is known that in an extraction process, the time of treatment rises with the square of the characteristic dimension, i.e., the thickness, of the flakes. Thus, particularly unfavorable effects can occur where the flakes deviate from a nominal value of thickness. When large deviations exist in the flake thickness, the thinner flakes are treated for an excessive time while the thicker flakes, if they are to be correctly treated, determine the duration of the treatment.

Attempts have also been made to makes flakes of a thickness considerably less than the usually made 0.3 millimeters (mm), for example, in the neighborhood of 0.15 millimeters. However, it has been found that such thin flakes stick together in the extracting mechanisms which have been used and, thus, behave as considerably thicker flakes.

A further unfavorable phenomenon in the production of flakes, up to the present time, has been the inability of producing flakes of uniform thickness. Further, as the flakes become thinner, the deviations increase percentagewise. Generally, this has been caused since the flakes have been rolled in rolling mills whose rollers, after being supplied with the granular material to be rolled, have sagged or flexed to some degree. This, on the one hand, has produced a difference in thicknesses between the middle and the ends of the rolling mill and, on the other hand, this difference in thickness has varied because of the difference in deflection of the rollers with a larger or smaller supply of the material. For this reason alone, it has not been possible to produce flakes with a thickness below a certain limit, i.e. in the region of 0.3 millimeters (mm). If thinner flakes were to be produced in the rolling mill, then either a very irregular product was obtained or the undesireable sticking together phenomenon occurred in the extraction mechanism.

Accordingly, it is an object of the invention to produce flakes of uniform thickness than formerly.

It is another object of the invention to avoid sticking together of flakes in an extraction process.

It is another object of the invention to provide an apparatus for producing thin flakes of uniform thickness.

It is another object of the invention to improve extraction efficiency in the processing of flakes.

Briefly, the invention relates to a process for producing flakes which comprises the steps of rolling a granular product into flakes of flat shape and of thereafter deforming the flakes into a shape different from a flat shape. During this process, the flakes are rolled to a thickness of less than 0.2 millimeters (mm). Thus, by rolling the flakes to a thinness not previously obtainable, subsequent extraction processing can be considerably accelerated. Further, the deformation of the flakes prevents a sticking-together of the flakes and allows use of the flakes despite the greater thinness.

The produced flakes are made of a uniform thickness relative to each other with the thickness of the individual flakes deviating from one another by less than 0.05 millimeters (mm). This measure which is difficult to obtain with previously known equipment, allows more uniform control of the extracting operation than previously possible with optimum results.

The invention further provides an apparatus for carrying out the above process which includes a rolling mechanism having at least one deflection-compensating roller for rolling a granular product into flakes and a texturizing mechanism downstream of the rolling mechanism for receiving the flakes and deforming the flakes into a shape different from a flat shape. The deflection-compensating roller allows a particularly great uniformity of flake thickness as well as minimum thickness to be obtained. The texturizing mechanism causes a deformation of the flakes so that sticking together in a extraction mechanism is avoided.

In one embodiment, the texturizing mechanism includes elements which have interengaging surfaces for deforming the flakes. These elements can be in the form of rollers or endless belts which are drivingly disposed over a plurality of guide rollers. Use may also be made of a combination of a roller and belt or of more than two such elements. In either case, the texturizing surfaces may be formed as grooves with sharp or rounded edges, as knob-like protrusions with corresponding recesses, and the like. The various texturizing elements serve to press the flakes into corresponding undulated or shell-like shape.

In another embodiment, the texturizing mechanism is formed of at least two interacting elements such as endless belts having rough surfaces and means operatively associated with elements for driving these surfaces at different speeds from each other to deform the flakes between the rough surfaces into a roll shape.

The texturizing mechanism is disposed below an outlet of the rolling mechanism through which the flakes are dispensed. Thus, the flakes can fall out of the rolling mechanism directly into the texturizing mechanism under gravity for immediate deformation withouth danger of sticking together as might otherwise occur in transporting the flakes from a rolling mechanism to a texturizing mechanism. In addition, the pressure area of the texturizing mechanism in which deformation of the flakes takes place is offset horizontally from the outlet of the rolling mechanism. This ensures that the flakes emerging from the rolling mechanism will be separated from one another and introduced in succession into the pressure area of the texturizing elements so that a sticking together of sucessive flakes is avoided. To this end, the surface speed of the elements of the texturizing mechanism may be greater than the peripheral speed of the roller of the rolling mechansim.

These and other objects and advantages of the invention will become more apparent from the following detailed description taken in conjunction with the accompanying drawings in which:

FIG. 1 diagrammatically illustrates the dependance of the duration of the extraction process on the thickness of flake -like materials;

Figure 1:
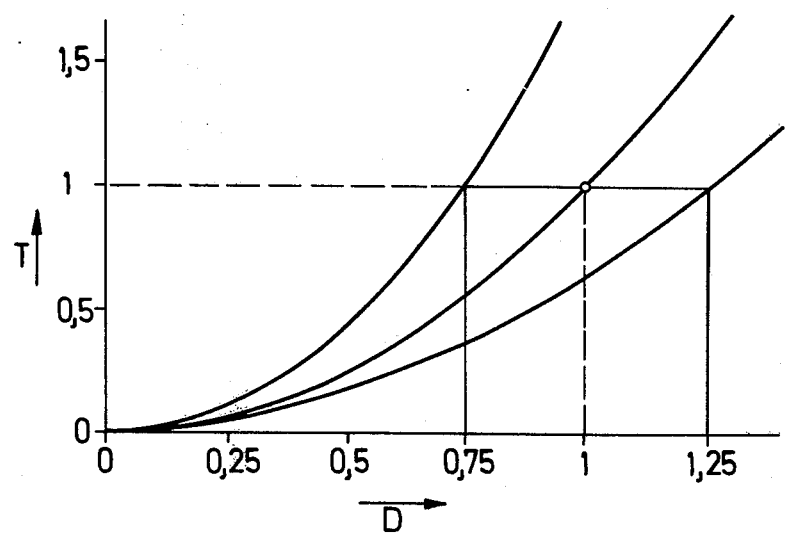

Referring to FIG. 1, as is known the duration T of the extraction of flakes depends on the thickness D of the flakes. In principle, the extraction process is a diffusion process in which the treatment time rises with the square of the characteristic dimension, in this case the flake thickness. In FIG. 1, the middle curve of the three shown shows the normal treatment, e.g. the maximum yield. Naturally, the time required for maximum yield is considerably longer than for a normal yield and is established from economic points of view. The lowermost of the three curves shows the limit of insufficient treatment which, in no case should be fallen short of. From FIG. 1, it is also evident how unfavorably variations of the thickness D of the flakes act on the duration of treatment or on irregular treatment of the falkes.

Figure 2:
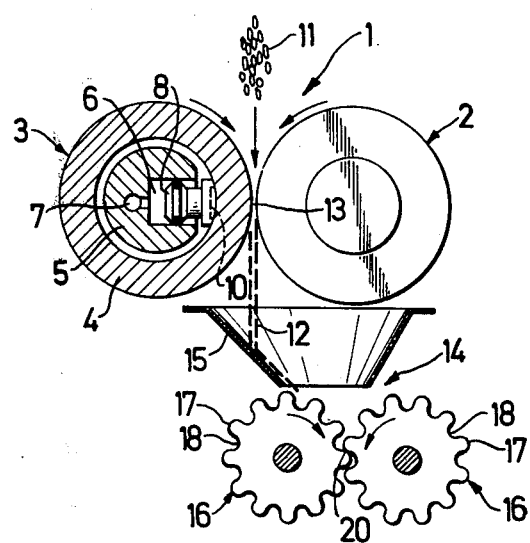
FIG. 2 illustrates a view of an apparatus according to the invention texturizing rollers.

Referring to FIG. 2, an apparatus for producing flakes comprises a rolling mechanism or means such as a rolling mill 1, having a normal roller 2, which is for example provided with a drive, and a roller 3 for compensating bending or deflection. The deflection-compensating roller 3 comprises a roller-jacket 4 which is mounted to turn round a rigid central carrier 5. A plurality of cylindrical holes 6 of considerable number are formed in the carrier 5 in a row and are supplied with hydraulic medium under pressure via a bore 7. Hydrostatic supporting or propping elements 8 are sealingly guided in the holes 6 and, by means of the hydraulic pressure, are pressed against the jacket 4 to press the jacket 4 uniformly against the roller 2. The propping elements 8 are provided with hyrdostatic bearing pockets 10, against which the jacket 4 slides and to which pockets, oil is supplied under pressure via bores (not shown) from the cylinder holes 6.

Deflection-compensating rollers which are made as above have a characteristic of bearing snugly against the counterroller 2 because of the uniform loading, even when bending under a load. Therefore, as a rule, a uniform application of pressure exists along the entire length of the pressure gap 13 formed between the rollers 2, 3. This applied pressure may also be regulated, by the pressure of the hydraulic medium, so that a desired thickness of flakes is obtained. It is, however, also possible to construct the rollers 2, 3 so that a constant pressure gap is maintained. This form of construction of the rollers may be accomplished in any suitable manner for example, as described in U.S. Pat. No. 3,802,044, and need not be further described.

The rolling mechanism 1 is adapted to receive a charge or stream of granular material 11, such as coarsely crushed soy beans, in the pressure gap 13 and to roll the material 11 between the rollers 2,3 into flakes 12 having a substantially flat shape and a thickness of less than 0.2 millimeters and preferably 0.1 millimeters. The flakes 12 then fall out of the pressure gap 13, the pressure gap 13 forming an outlet of the rolling mechanism 1.

Figure 5:
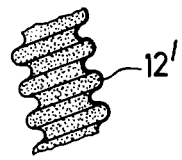
FIG. 5 illustrates the form of a flake obtained by the apparatus of FIG. 2.

The apparatus also includes a texturizing mechanism or means 14 downstream of the rolling mechanism for receiving the flakes 12. The texturizing mechanism 14 includes a pair of texturizing elements in the form of rollers 16 having interengaging texturizing surfaces. These rollers 16 are rotatably mounted and at least one is provided with a drive (not shown). The surfaces of the rollers 16 are formed by alternating protrusions 17 and grooves 18 which mesh with each other as shown within a pressure area 20. The texturizing mechanism 14 also includes a funnel 15 for feeding the flakes 12 between the texturizing rollers 16. During operation, the flakes 12 pass between the meshing rollers 16 and are deformed by means of the protrusions 17 and grooves 18 into a shape different from a flat shape, i.e. into an undulating shape as shown in FIG. 5. This undulation prevents a sticking together of the flakes 12 during further treatment, for example in an extractor.

As is also evident from FIG. 2, the pressure area 20 of the texturing mechanism, that is the area where the protrusions 17 and the grooves 18 engage with one another, is offset horizontally from the pressure gap 13 forming the output from the rolling mechanism 1. Also, the rotary speeds of the rotating rollers 2, 3 o the rolling mechanism 1 and the rollers 16 of the texturing mechansim 14, turning in the directions of the arrows, are chosen so that the rollers 16 of the texturizing mechanism 14 have a greater surface speed than that of the rollers 2, 3 of the rolling mechanism 1. In this way, pressing together of the flakes 12 falling out of the rolling mechanism 1 is avoided. The lateral offset of the pressure gap 13 from the pressure area 20 has the result that the flakes 12 emerging from the rolling mechanism 1 slide in separated manner from one another over the wall of the funnel 15. Because of the greater peripheral speed of the rollers 16, the flakes 12 are taken away from the funnel 15 more rapidly than they reach the funnel 15.

Figure 3:
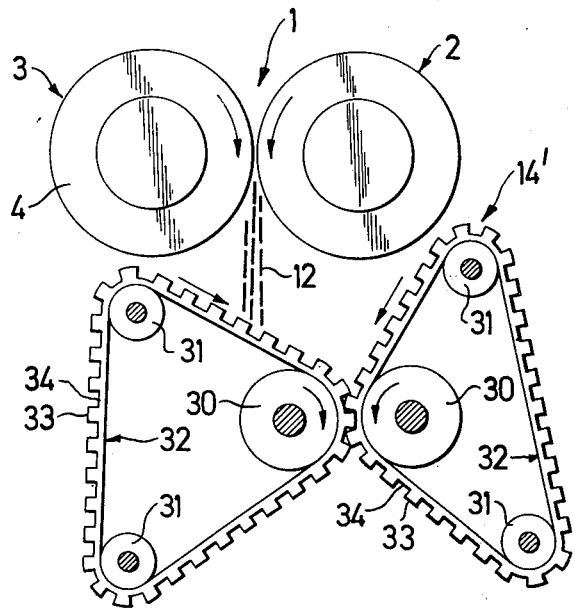
FIG. 3 illustrates a modified apparatus according to the invention using endless belt texturizing elements.

Referring to FIG. 3, wherein like numbers indicate like parts as above, the texturizing mechansim 14 may alternatively be constructed with texturizing elements in the form of endless belts 32 which are drivingly disposed over a plurality of guide rollers 30, 31. The texturizing surfaces of the belts 32 are each provided with protrusions 33 and grooves 34 mesh with the grooves and protrusions of the other belt 32. The protrusions 33 and 34 may be sharp-edged as shown or else, as the rollers 16 of FIG. 2, may have rounded-off edges. The rolling mechanism 1 is substantially the same as in FIG. 2, however, for purposes of clarity the details of the deflection-compensating roller 3 is omitted.

Figure 6:
FIG. 6 illustrates the form of a flake obtained by the apparatus of FIG. 3.

In operation, flakes 12 are dispensed from the rolling mechanism 1 onto one of the belts 32 and then passed between the meshing belts 32 to be deformed into the shape as shown in FIG. 6.

Figure 4:
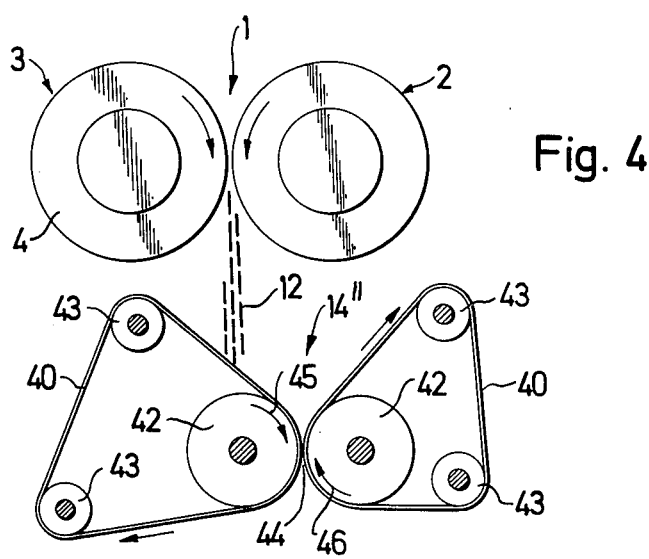
FIG. 4 illustrates a further modified apparatus according to the invention using endless belts with roughened surfaces.

Referring to FIG. 4, wherein like reference characters indicate like parts as above, the texturizing mechanism 14″ may include at least two interacting elements in the form of endless belts 40, 41 which run over guide rollers 42, 43. Each belt 40,41 has a rough surface and a suitable means (not shown) for driving the belts 40, 41 at different speeds from each other is provided. As indicated by the arrows 45,46 the belts 40,41 also move in opposite directions toward a working area 44 of the texturizing mechanism 14″.

Figure 7:
FIG. 7 illustrates the form of a flake obtained by the apparatus of FIG. 4.

During operation, flakes 12 which are dispensed from the rolling mechanism 1 onto the belt 40 are moved toward the working area 44 and then are passed through the working area 44 between the belts 40, 41 to be deformed. Upon passing from the working area, the flakes are in the roll form shown in FIG. 7.

The direction of movement of each belt 40, 41 can also be toward the working area 44. In this case, however, the speeds of the belts 40, 41 would be of different magnitude in order to deform the flakes 12.

Through these measures, it is ensured that the flakes 12 become deformed at the work area 44 by being rolled up through the relative movement of the belts 40, 41.

The flakes obtained by the invention have shapes that avoid a sticking together and agglomeration of the individual flakes in an extractor. The flakes may therefore have a substantially smaller thickness than previously. The deflection-compensation roller which is used provides for the necessary uniformity.

What is claimed is:

1. An apparatus for producing flakes comprising
   a rolling means including at least one deflection-compensating roller for rolling a granular product into flakes of flat shape; and
   a texturizing means downstream of said rolling or means for receiving the flakes and deforming the flakes into a shape different from a flat shape.

2. An apparatus as set forth in claim 1, wherein said texturizing means includes texturizing elements having interengaging texturizing surfaces.

3. An apparatus as set forth in claim 2, wherein said elements are rotatable rollers.

4. An apparatus as set forth in claim 2 wherein said texturizing elements have a greater peripheral speed than said roller of said rolling means.

5. An apparatus as set forth in claim 2 wherein each of said elements is an endless belt drivingly disposed over a plurality of guide rollers.

6. An apparatus as set forth in claim 1 wherein said texturizing means includes at least two interacting elements having rough surfaces, and means operatively associated with said elements for driving said surfaces of said elements at different speeds from each other to deform flakes between said rough surfaces into roll shape.

7. An apparatus as set forth in claim 6 wherein said elements are endless belts and said driving means includes guide rollers within said belts.

8. An apparatus as set forth in claim 1 wherein said rolling means has an outlet for dispensing the flakes and said texturizing means is disposed below said outlet to receive the flakes under gravity.

9. An apparatus set forth in claim 8 wherein said texturizing means has a pressure area therein for deformation of the flakes, said pressure area being offset horizontally from said outlet of said rolling means.

10. An apparatus as set forth in claim 1 wherein said rolling means includes a second roller disposed horizontally opposite said deflection - compensating roller.

11. An apparatus for producing flakes comprising
    a rolling means including a driven roller and a deflection-compensating roller pressed uniformly against said driven roller for rolling a granular product therebetween into flakes of flat shape and of a thickness less than 0.2 millimeters; and
    a texturizing means downstream of said rolling means for receiving the flakes and deforming the flakes into a shape different from a flat shape.

12. An apparatus for producing flakes comprising
    a rolling means including a driven roller and a deflection-compensating roller, said rollers defining a constant pressure gap therebetween for rolling a granular product into flakes of flat shape and of a thickness less than 0.2 millimeters; and
    a texturizing means below said rolling means for receiving the flakes and deforming the flakes into a shape different from a flat shape.

* * * * *

UNITED STATES PATENT AND TRADEMARK OFFICE
CERTIFICATE OF CORRECTION

PATENT NO. : 4,116,601
DATED : September 26, 1978
INVENTOR(S) : Rolf Lehmann et al It is certified that error appears in the above-identified patent and that said Letters Patent are hereby corrected as shown below:

Column 1, line 7, change "a" to --an--

Column 2, line 31, after "with" insert --the--

Column 4, line 16, change "o" to --of--

Column 4, lines 17-18 change "mechansim" to --mechanism--

Column 4, line 36, after "34" insert --which--

Column 5, line 16, after "rolling" delete --or--

Signed and Sealed this

Twenty-seventh Day of March 1979

[SEAL]

Attest:

RUTH C. MASON
Attesting Officer

DONALD W. BANNER
Commissioner of Patents and Trademarks